M. W. SILVERTHORNE.
PORTABLE COMBINED COTTON PICKING, GINNING, CONDENSING, AND COMPRESSING MACHINE.
APPLICATION FILED JULY 8, 1918.
1,314,437.
Patented Aug. 26, 1919.
2 SHEETS—SHEET 1.
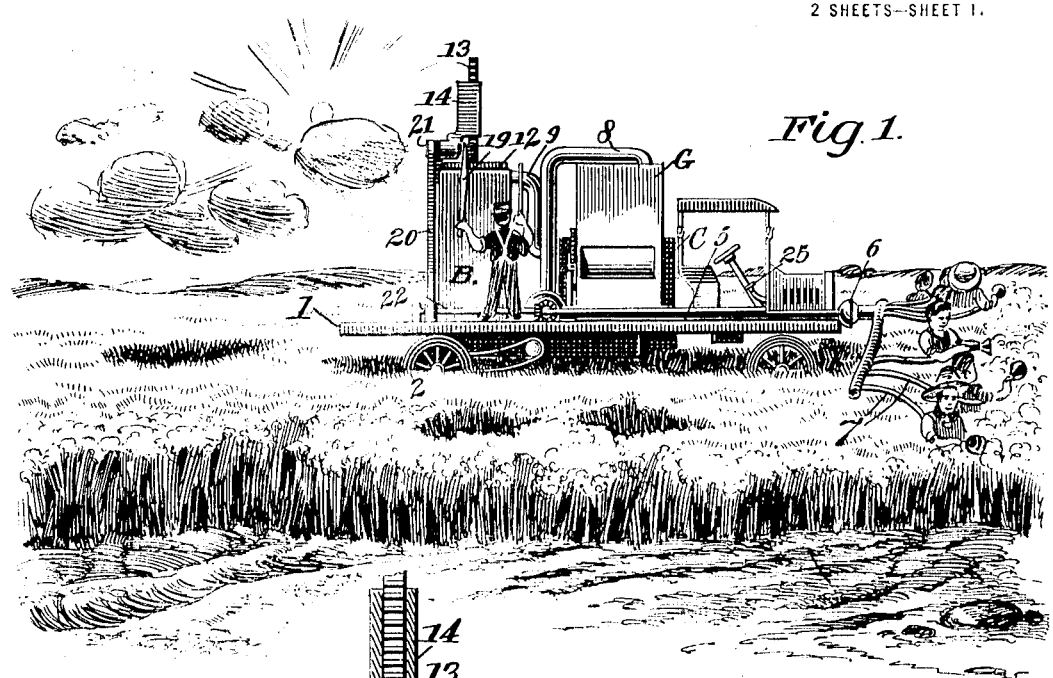
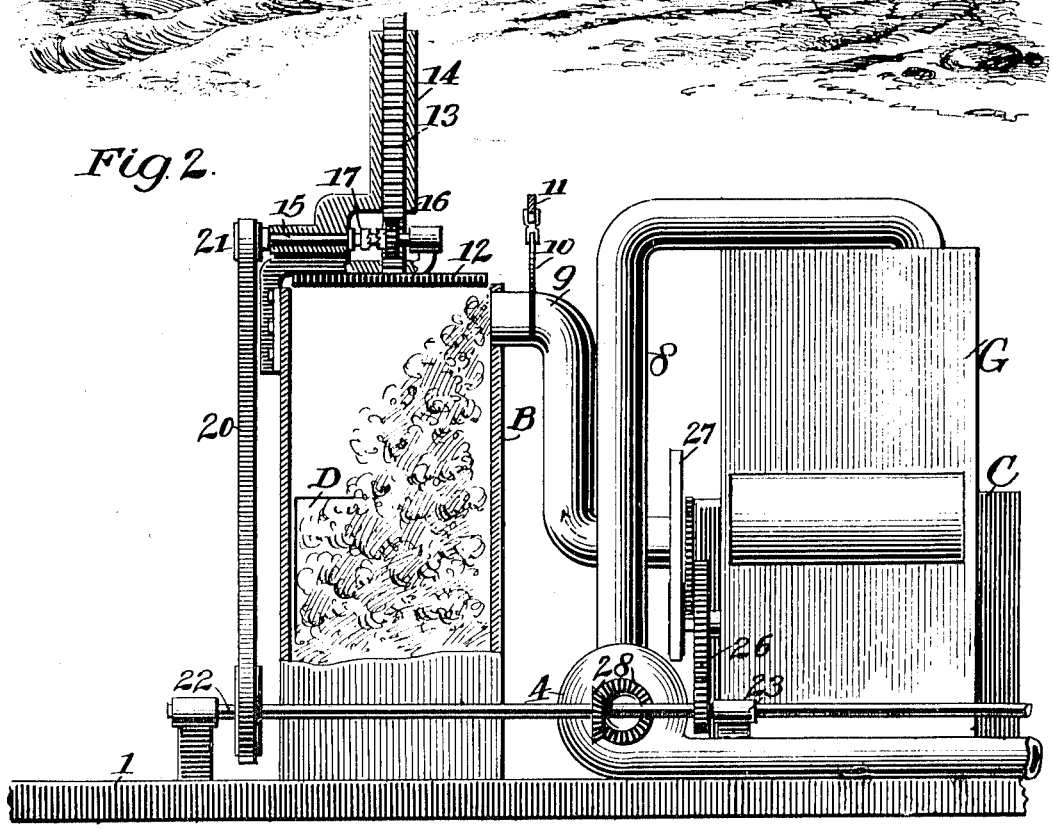
WITNESSES
J. S. Schrott
INVENTOR
Mary W. Silverthorne.
BY
ATTORNEYS M. W. SILVERTHORNE.
PORTABLE COMBINED COTTON PICKING, GINNING, CONDENSING, AND COMPRESSING MACHINE.
APPLICATION FILED JULY 8, 1918.
1,314,437.
Patented Aug. 26, 1919.
2 SHEETS—SHEET 2.
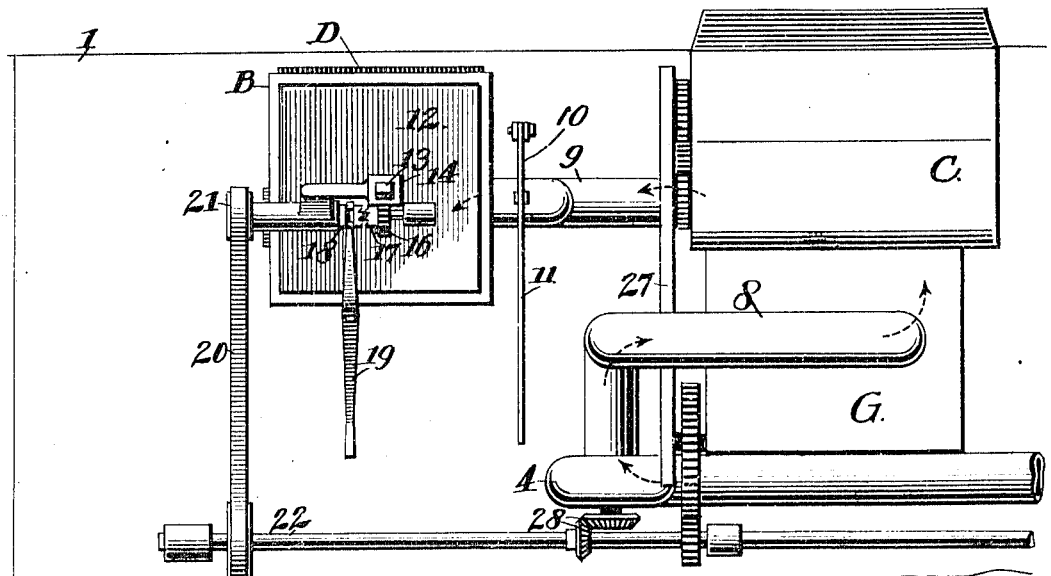
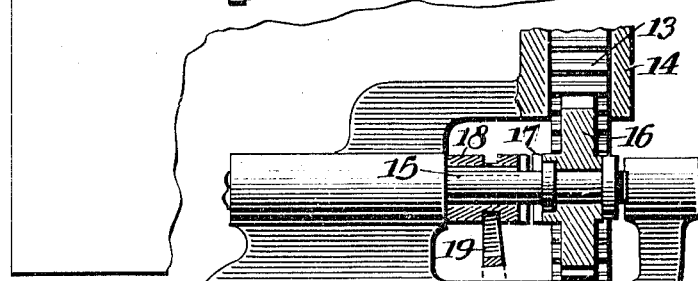
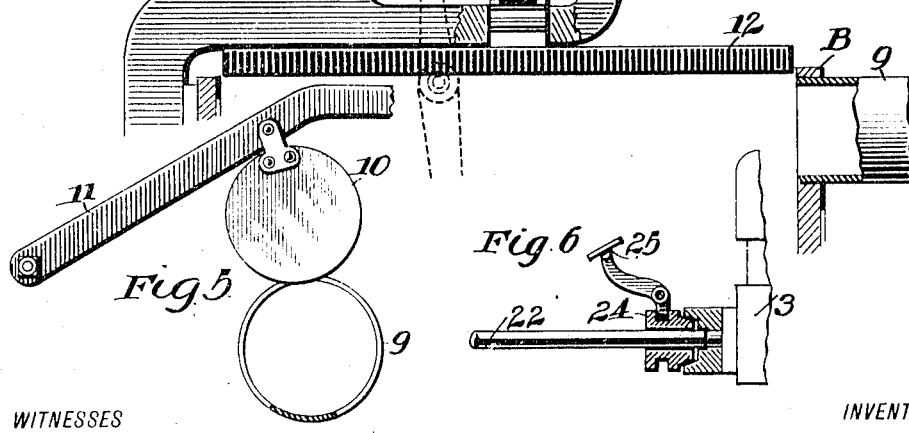
WITNESSES
J. T. Schrott
INVENTOR
Mary W. Silverthorne,
BY
ATTORNEYS

UNITED STATES PATENT OFFICE.

MARY W. SILVERTHORNE, OF MARTINS, SOUTH CAROLINA.

PORTABLE COMBINED COTTON PICKING, GINNING, CONDENSING, AND COMPRESSING MACHINE.

1,314,437.                  Specification of Letters Patent.     Patented Aug. 26, 1919.

Application filed July 8, 1918. Serial No. 244,000.

*To all whom it may concern:*

Be it known that I, MARY W. SILVERTHORNE, a citizen of the United States, and a resident of Martins, in the county of Barnwell and State of South Carolina, have invented certain new and useful Improvements in Portable Combined Cotton Picking, Ginning, Condensing, and Compressing Machines, of which the following is a specification.

My invention relates to improvements in cotton handling machines, and it consists in the constructions, combinations and arrangements herein described and claimed.

An object of my invention is to provide a cotton handling machine in which the most important feature resides in the combination of cotton picking, ginning, condensing and compressing mechanism on a vehicle to render the machine portable and capable of being moved into a field as an entire unit so that the complete operations from the picking of the cotton to the baling thereof, may be finished on the field.

Another object of the invention is to provide a machine of the type described which enables the performance of the aforesaid operations with a minimum number of helpers and with the reduction to a minimum of the work attendant upon said operations.

A further object of the invention is to provide a cotton handling machine including the combination on a truck of a cotton picking mechanism, a gin, a condenser and a baler, the cotton being transferred from one to the other by a continuous air current.

Other objects and advantages will appear in the following specification, reference being had to the accompanying drawings in which:

Figure 1 is a perspective view illustrating the entire machine at work in a field, Fig. 2 is a detail side elevation of the machine with parts shown in section, Fig. 3 is a detail plan view, Fig. 4 is an enlarged detail view of the follower operating mechanism, Fig. 5 is a detail view of a gate valve in the pipe line, and Fig. 6 is a detail view of the clutch.

The foremost principle of the invention consists in the assembling of the various elements of cotton handling machinery on an automobile truck or other vehicle, so as to constitute a unit cotton handling machine which may enter a cotton field and complete all of the operations from the initial picking of the cotton to the final baling thereof, on the spot. To this end, I provide an automobile truck 1 which has the usual wheels 2 and the engine 3.

Mounted on the automobile truck is a cotton gin G at the front, a condenser C and a cotton compress or baler B. An exhaust fan has a suction pipe 5 which extends to the front and terminates in a coupling 6 where it branches out into a plurality of pipes 7. The ends of these pipes have suction cotton picking heads of any ordinary construction, which are adapted to be taken into the hands of the operators and led over the cotton bolls in order to pick them from the stalks, whereupon they are drawn into the suction pipe 5 by virtue of the action of the exhaust fan 4.

A discharge pipe 8 leads from the exhaust fan 4 to the top of the gin G. Here the cotton picked at the ends of the pipes 7, is discharged into the cotton gin G, from whence it is conducted to the condenser C with which it is in communication. The illustration of the gin G is simply intended to show the relative position thereof on the truck and it is to be understood that in actual practice some suitable means for the disposal of the cotton seed is provided. Such means will consist of a chute leading off to one side from whence the cotton seed may be collected in bags. The function of the condenser C is to clean the cotton of foreign matter, such as dust. A pipe line 9 leads from the condenser C to the top of the baler B into which the picked cotton is discharged by virtue of the air from the exhaust fan behind it. A gate valve 10 capable of being operated by a lever 11 on which it is mounted, is used to close the pipe line 9 when the baler B is sufficiently filled.

Movable down into the baler B from the open end at the top is a follower 12. The follower carries a rack 13 which is guided in a bearing 14. A countershaft 15 journaled in suitable bearings at the base of the guide 14, carries a normally idle pinion 16 which has a clutch member 17 at one side.

A movable clutch member 18 which is splined on the counter shaft 15, is movable into engagement with the clutch member 17 by a lever 19 which is pivoted on the front of the baler B. The counter shaft 15 is driven by a belt 20 which is applied to pulleys 21 on the counter shaft 15 and on a main shaft 22 respectively.

The main shaft 22 is journaled in suitable bearings 23 and is arranged to be driven by the engine 3. For this purpose a movable clutch 24 capable of operation by a foot lever 25, is provided. By this means, the main shaft 22 may be made to run only when it is desired to operate the mechanism on the truck 1. Under other and ordinary conditions, when it is simply desired to move the truck from place to place, the main shaft 22 is thrown out of operation.

The main shaft 22 is also the source of power by means of which the cotton gin G and the condenser C are operated. Pinion and gear devices 26 operate the gin G from the main shaft 22 while other driving connections 27 operate the condenser C from that shaft in the gin G on which the gear 26 is mounted. Bevel gears 28 on the main shaft 22 and on the shaft of the exhaust fan 4 respectively, operate the fan to create a current of air in the discharge pipe 8, and the suction in the pipe 5.

In operation, the cotton handling machine is run into a field of cotton, substantially as illustrated in Fig. 1. The clutch 24 is normally out so that the main shaft 22 is dormant. When a desirable position in the cotton field is reached, the operatives take the ends of the branch pipes 7.

The clutch 24 is now thrown in by means of the foot lever 25, when the main shaft 22 revolves and operates the exhaust fan 4, the gin G, and the condenser C. The suction in the pipe 5 causes the cotton to be drawn in and discharged into the pipe 8 from whence it goes to the gin G. It is to be observed that the cotton is conveyed to the exhaust fan 4 by suction, and from thence throughout the remaining devices by air pressure.

After the cotton passes through the condenser C, it is conducted to the baler B via the pipe line 9. When the baler B becomes sufficiently full, the gate valve 10 is closed and the clutch member 18 on the counter shaft 15 is thrown into contact with the clutch member 17. With respect to the cotton under air pressure behind the now closed valve 10, in actual practice a second baler B will be provided on the truck, so that while one is compressing, the other is filling. This arrangement is quite obvious and for this reason is not illustrated. The follower 12 now begins to descend and compresses the cotton therebeneath.

It is to be observed that in illustrating the invention, many of the operating parts of the various devices on the truck 1 have been omitted. This is true of the gin G, the condenser C and the baler B. It is desired to emphasize principally the assembly of the various devices on an automobile truck so as to render the cotton plant portable and to provide it as a unit. Therefore, for the sake of simplicity, the parts referred to have been omitted and this applies equally as well to the baling or tying mechanism of the baler B. No such mechanism is shown in Fig. 2, but it is to be understood that the baler B is of any of the well known constructions and provided with means for inclosing the compressed cotton and tying it together in a bale. After the bale is formed, it is discharged out at one side through a door D, either into a wagon or onto the field.

In arranging the cotton handling plant herein described, the fact has not been ignored that there are at present on the market individual mechanisms for performing the several operations herein outlined. These mechanisms are all very large as a rule and it is universally necessary to transfer the cotton from one to the other by means of teams. All this requires much time and considerable labor and both of these essentials are found to be universally lacking at this time.

It therefore follows that in designing the cotton handling machine herein described, the underlying thought is to provide a portable cotton handling plant which includes all of the necessary mechanism for taking the cotton in its original state on the field and converting it into bales right at the place where it is picked. With such a cotton handling plant, but little labor is required. It often occurs that entire fields of cotton will be left standing from one season to another simply for the reason that help cannot be obtained to do the harvesting. With my device an entire field of cotton can be picked and baled in a very short time as compared with the old and present method, principally for the reason that the hauling to and fro of the cotton is omitted.

While the construction and arrangement of the device herein described and claimed, is that of a generally preferred form, obviously modifications and changes may be made without departing from the spirit of the invention or the scope of the claims.

I claim:—

1. The combination, of a fan, suction pipes with picker heads branching from the fan, and a plurality of devices for subsequently treating the suction picked cotton, including a ginner, condenser and baler, all in air communication with said fan and operated by a common drive shaft.

2. In a cotton handling machine, a vehicle having an engine, a common main drive shaft driven by the engine, with a controlling clutch connection, an exhaust fan operated by said shaft, a cotton picking suction pipe leading to the exhaust fan, a gin operated by said shaft, a cotton discharge pipe leading from the fan to the gin, a condenser having means arranged to be driven by a moving part of the gin, a baler, a cotton pipe line leading from the condenser to the baler, a movable follower operating in the baler, means driven by said shaft for moving said follower, and means including a gate valve in the pipe line for stopping the flow of cotton into the baler during the operation of the follower.

3. In a cotton handling machine, a vehicle having an engine, a common main shaft disposed lengthwise of the vehicle and arranged to be driven by the engine, an exhaust fan operatively connected at one place to said shaft, a cotton picking suction pipe leading to the exhaust fan, a gin operatively connected at another place to said shaft, a cotton discharge pipe leading from the fan to the gin, a condenser having means arranged to be driven by a moving part of the gin, a baler, a cotton pipe line leading from the condenser to the baler, a movable follower operating in the baler, a rack carried by the follower, a counter shaft, a loose gear on the counter shaft having a clutch face, driving connections between the counter shaft and the main shaft, and a movable clutch member on the counter shaft, arranged to be moved against the clutch face of said gear.

4. The combination on a vehicle, of a common engine driven shaft, an exhaust fan driven by the shaft, a gin driven by the shaft, a condenser driven by a moving part of the gin, a baler having a compressing follower driven by said shaft, and cotton conveying pipes leading to and from the exhaust fan, providing a continuous conveyance of the cotton from the field through the gin and the condenser to the baler.

5. A portable cotton handling machine, comprising a truck, cotton treating apparatus on the truck including a ginner, condenser, baler and fan having a forward pipe connection terminating in a universal joint, a plurality of picker heads branching from a connection leading to the universal joint, a conduit leading from the fan, connecting the aforesaid apparatus and constituting a continuous air line from the picker heads to the baler, a single driven shaft with operating connections to all of the members of said apparatus, means within reach of the operator for controlling the baler, including a driven countershaft with a pinion and operable clutch connections, a plunger with a rack engaged by the pinion, a universal bearing for the shaft and rack; and cut-off means under control of the operator for cutting off the flow of cotton into the baler during compressing, said means including a valve operating across an adjacent portion of the aforesaid conduit.

MARY W. SILVERTHORNE.